Fig.5.
Fig.6.
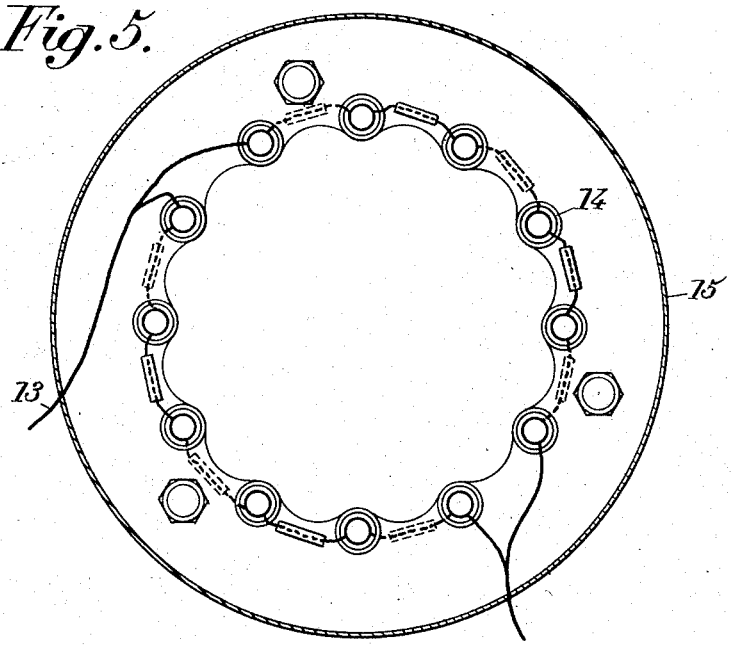
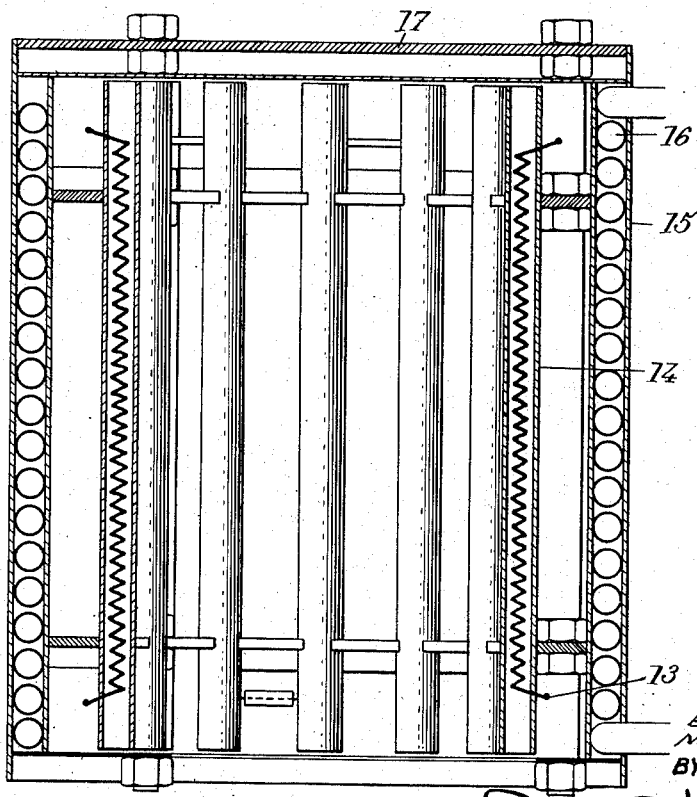

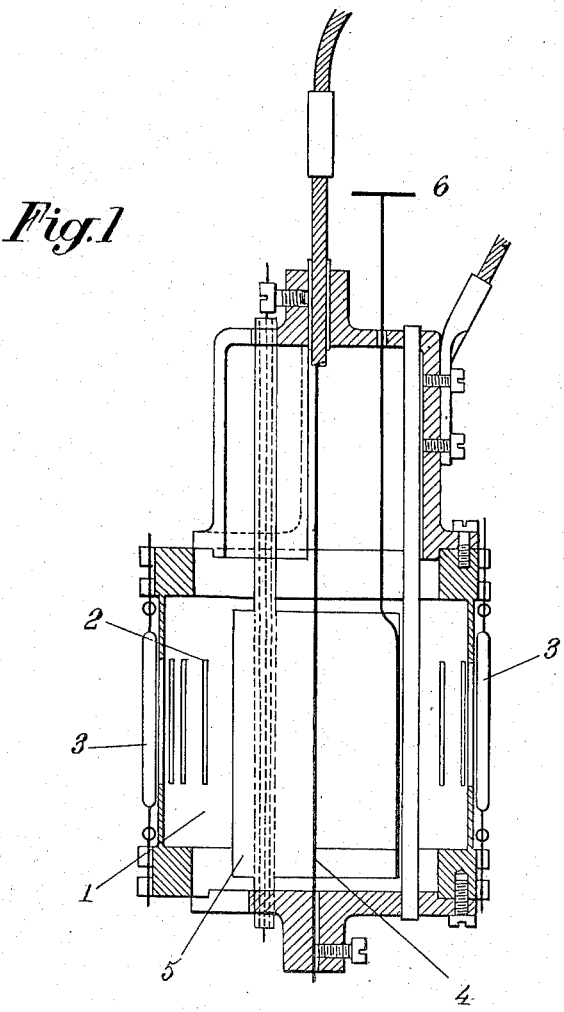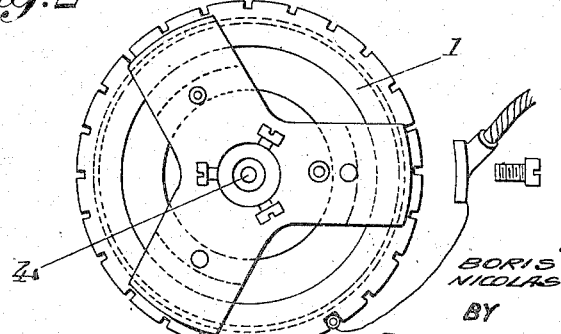

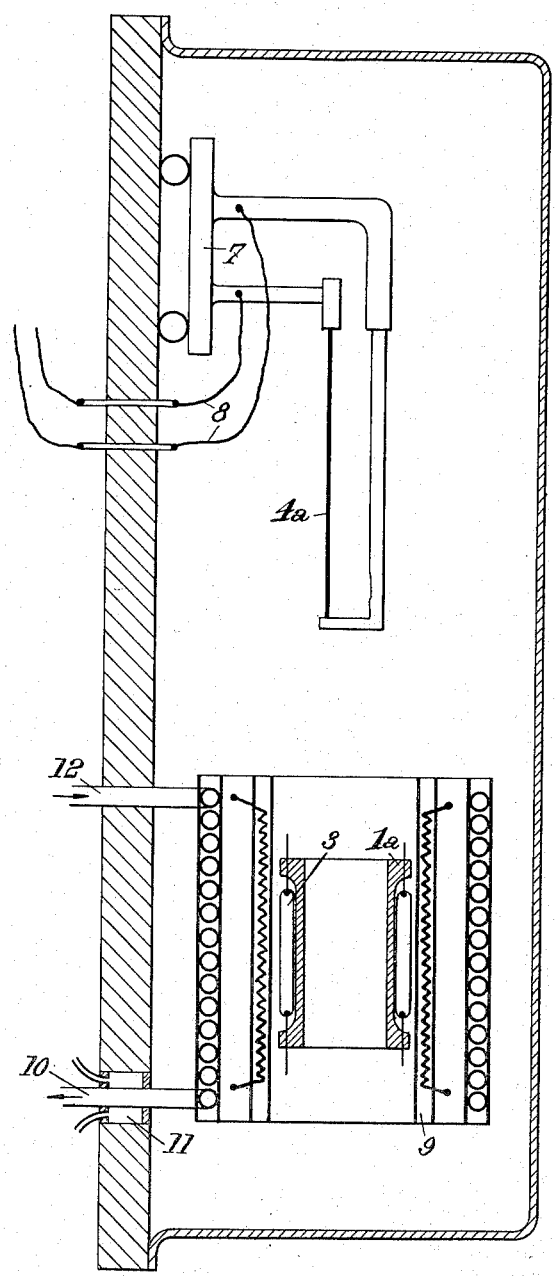

Fig. 7
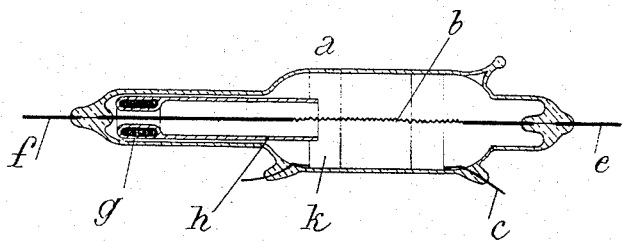
Fig. 8.
Fig. 8a.
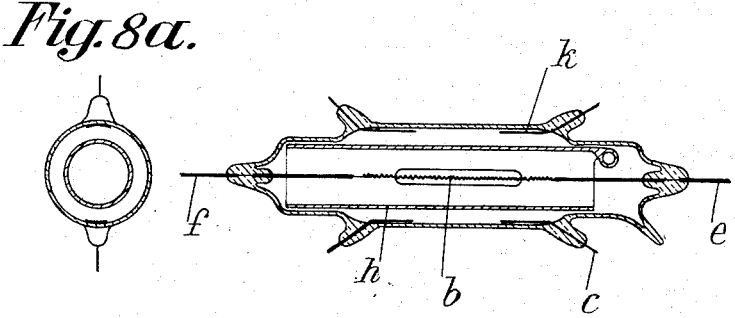
Fig. 9.
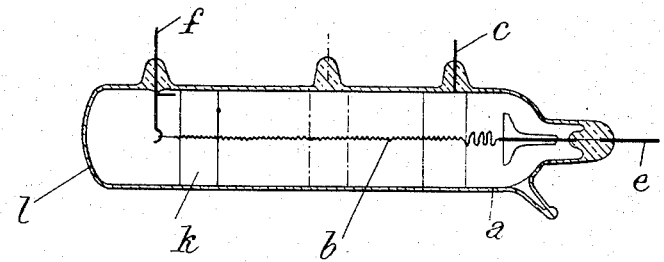
INVENTORS
BORIS VODAR,
NICOLAS MOSTOVETCH,
BY
Robert B Larson
ATTORNEY INVENTORS
BORIS VODAR,
NICOLAS MOSTOVETCH,
BY
Robert B. ...
ATTORNEY United States Patent Office 2,801,607
Patented Aug. 6, 1957

2,801,607

APPARATUS FOR APPLYING MATERIAL BY THERMAL VAPORIZATION IN THE MANUFACTURE OF ELECTRICAL RESISTORS

Boris Vodar, Paris, France, and Nicolas Mostovetch, Louisville, Ky., assignors to Centre National de la Recherche Scientifique, Paris, France, a society of the Republic of France Application July 28, 1953, Serial No. 370,851

Claims priority, application France August 6, 1952

5 Claims. (Cl. 118—49.1)

The present invention relates to electrical elements and in particular resistors constituted by thin layers or deposits.

Preferred embodiments of the present invention will be hereinafter described with reference to the accompanying drawings, given merely by way of example, and in which:

Fig. 1 is a diagrammatic elevational view of a device for making film-like resistors according to our invention;

Fig. 2 is a corresponding end view;

Fig. 3 is a view similar to Fig. 1 relating to a modification;

Figs. 5 and 6 are an end view and an elevational view of an outgassing device according to our invention;

Fig. 7 is a diagrammatic sectional view of a resistor made according to our invention;

Figs. 8 to 12 are views similar to Fig. 7 relating to modifications, Figs. 8a and 11a being transverse sections of the resistors of Figs. 8 and 11 respectively.

Figure 4:
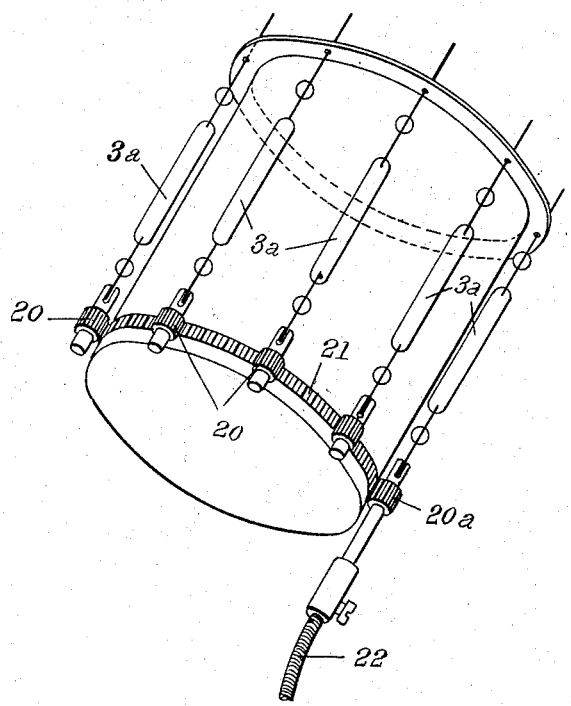
Fig. 4 is a detail view.

The advantages of electrical resistors constituted by metal films layers deposited on insulating supports are known, in particular in the case of high ohmic values, these advantages consisting in particular in a good evacuation of the heat formed by Joule effect, a low capacity, etc. It is also known that a very good method of obtaining such resistances consists in evaporation of the metal by heating under a high vacuum. It is also known that this method is particularly useful in the case of very thin layers, that is to say of very high resistances because the other methods (chemical depositing, electrochemical depositing by cathode atomizing, etc.) do not make it possible to obtain sufficiently thin continuous layers.

However, even with the method of evaporation under vacuum, it is known that great difficulties are met in forming metallic film-like deposits of a good quality in general and having in particular good electrical characteristics such as a low background noise, proportionality of current to potential, that is to say good linearity stability as a function of time, etc.

Recent experimental results have shown that in order to obtain metallic film-like resistors having the above mentioned qualities, it is very important to effect the deposit by evaporation only after the support on which this deposit is to be formed has been preliminarily outgassed under a vacuum by sufficient heating. We have also found that, as a rule, depositing must be made only after the support has cooled down to a temperature much lower than the outgassing temperature. Without entering into the details of interpretation of these remarks, it will however be pointed out that since adsorbed gases are always present on a surface that has not been outgassed, these gases perturb the adhesion of the evaporated metal on its support, which adhesion is the essential condition of its structural stability; on the other hand, too high a temperature of this support is unfavorable because it imparts too much mobility to the metal atoms, thus facilitating granulation of the layer, which has for its result to give a very imperfect conductivity and lower electrical characteristics in a general manner.

It is therefore undeniably of a high industrial interest to be able to make metal film-like resistors in the favorable conditions above mentioned and in technical conditions which make it possible to produce sufficient amounts of resistors within a relatively short time. This is one of the objects of the present invention.

This invention makes it possible simultaneously to obtain, by evaporation of the metal of a single filament, a multiplicity of metallic film-like resistors on supports which have been preliminarily outgassed by heating and quickly cooled down.

For this purpose, according to the present invention, the supports which are to receive the deposit are disposed along the generatrices of a cylinder, the filament being disposed on the axis or in the vicinity of the axis of this cylinder and the whole being placed in an outgassing furnace.

The apparatus illustrated by Fig. 1 includes a cylinder 1 the side wall of which is provided with slits 2 which limit the evaporated deposit and opposite these slits and behind them are located supports 3 which must be covered with the film-like deposits constituting the resistors. These supports 3 are for instance constituted by small glass rods or bars provided with electrodes. A filament of the substance which is to be evaporated and deposited on these glass supports is provided at 4 axially inside cylinder 1. In this construction, the filament is rigidly mounted with respect to cylinder 1. A cylindrical shield 5 is mounted inside cylinder 1 and around filament 4. This shield 5 may be displaced, for instance magnetically by means of a member 6 of a magnetic material so as to be either interposed between filament 4 and the slits 2 of cylinder 1, or to be retracted. When shield 5 is opposite the slits, it is possible to outgas the filament by means of a high electric current passing therethrough without the impurities or the metal evaporated from said filament during this shield depositing onto the resistor supports 3. For instance, in the embodiment shown by Fig. 1, the movement of shield 5 to place it into either operative or inoperative position will consist of a sliding movement along the axis of cylinder 1. According to a modification, the shield may be arranged to screen the slits when it is given a predetermined rotation about its axis. For this purpose, in this case the shield will be provided with slits of greater width and slits 2 will be arranged in a manner analogous to that disclosed by Fig. 1. The whole of the elements above mentioned is generally placed in an electrically heated furnace the construction of which will be more specifically referred to hereinafter. Outgassing of the cylinder, of the shield and of the resistor supports is achieved by the heating of this furnace.

In this case, the operations are as follows: the furnace is heated and then allowed to cool down to a temperature close to normal temperature. The filament is outgassed with the shield disposed in front of the resistor supports. Then the shield is retracted and the metal of the filament is evaporated so as to form the resistor films by passage of the metal vapors through the slots onto the supports. Fig. 2 is an end view of the whole of the cylinder and of its accessories.

According to a modification, the filament may be movable with respect to the cylinder which carries the resistors. Such as arrangement has many advantages and in particular that of making it unnecessary to provide a shield. It is then possible, during the outgassing operation, to move the filament to the outside of the cylinder. This will be obtained either by a displacement of the cylinder if the filament is rigidly fixed on the frame of the apparatus, or by a displacement of the filament when the cylinder is fixed. The advantage is that free access to the filament is possible when it is removed from the cylinder, whereby it can be replaced and possibly charged with the metal to be evaporated. Fig. 3 diagrammatically illustrates an arrangement according to which the filament is movable and the cylinder is fixed. Filament 4a is carried by a rigid support 7 which is movable along the plate of the vacuum bell jar by means of a suitable device (not shown), for instance either magnetically or through a mechanical transmission extending through said plate. The current input wires 8 are flexible wires. Cylinder 1a is much simpler than in the embodiment above described, since it does not include means for fixation of the filament thereto. It is merely constituted by a cylindrical tube with slits for the resistors. It is contained in the outgassing furnace 9 which will be described hereinafter.

The reverse arrangement, where the filament is rigidly fixed to the frame of the apparatus and the cylinder is movable, would correspond as a rule to a figure similar to Fig. 3. This arrangement is particularly interesting when the filament is disposed perpendicularly to the plate of the vacuum bell jar, because in this case it makes possible to provide, according to the invention, several evaporating filaments in the same vacuum bell jar, each of them being possibly surrounded by a furnace and cylinder unit. This has the advantage of making it possible, in the course of a single operation of evacuation by means of a vacuum bell jar, to manufacture a greater number of similar resistors or a plurality of different resistors; furthermore, a greater number of resistors is thus obtained without unduly increasing the diameter of the resistor carrying cylinder, which must not exceed a given limit for every value of the vacuum bell jar, that is to say for every value of the free travel of the atoms that are evaporated.

One of the advantages of evaporation through a slit is the obtainment of a sufficiently uniform deposit, which increases structural stability. Another way of obtaining a uniform deposit is to form it on the whole side surface of the supporting rod. If this rod is of cylindrical shape, a uniform deposit is obtained by rotating this rod about its axis during evaporation. According to our invention, deposits of this kind are obtained over the whole side surface of the supporting rods and simultaneously for a great number of such rods with a single filament by making use of the arrangements above described, but by imparting to each of the supporting rods a rotation about its axis by means of a single driving mechanism.

The resistor supports are mounted on small drums 20 rotating about their respective axes and driven, either by friction or through gear wheels 21, by one or several wheels mounted on the cylinder and actuated by one of the drums 20a itself driven for instance by a flexible transmission 22 communicating with the outside of the vacuum bell jar. An example of such an arrangement is given by way of example in Fig. 4. It will be seen that the modifications to be brought to the arrangement of Fig. 1 for instance are not very great. The slits may be either dispensed with or not, according as it is desired to obtain both kinds of deposits or only one of them. In the absence of slits and without rotation, it will be possible to obtain also deposits that are not uniform, over one half of the side surface of the supporting cylinders or substantially uniform deposits on the surface of a support having a substantially flat surface.

If, contrary to what has been explained, the supports are given a non uniform movement of rotation of a suitable kind about their respective axes, it will be possible to obtain deposits of a thickness which varies about their axis.

The constitution of the outgassing furnace is important. Its operation must not form on the resistor supports deposits as might be produced by evaporation of one of the components of the resistor wires serving to heat the furnace or to evaporate the oxides or the impurities of all kinds present on the filament. For this purpose, our invention is characterized by the use of a furnace having electric resistors which are protected by refractory tubes, whereby the resistor supports cannot receive directly any evaporation product coming from these heating elements. Another important condition in the construction of the furnace is that its heating must be quick as its cooling too, because, as above stated, evaporation must take place on a surface which has been sufficiently cooled down. We comply with both of these conditions by making a furnace having a low calorific mass, i. e. as light as possible. However, we observe that it is particularly advantageous to reduce the cooling period which, in the absence of special precautions, corresponds to an important part of the total time of manufacture, due to the low dissipation of heat in a vacuum. Consequently, our outgassing furnace is cooled down by a circulation of air (or if necessary of another fluid) under atmospheric pressure, for instance inside hollow elements impervious to vacuum and which communicate with the outside of the bell. In order to avoid heating of the plate of the bell on the side where air flows out after having been in contact with the furance, we deliberately cool down this outlet by an air stream or an auxiliary water stream. Besides, in order to avoid transmission of heat from the furnace during the operation thereof, near both of the outlets of the cooling tube, these tubes are made of a thin metal having a low thermal conductivity. Furthermore, we take into account the fact that these tubes, at least in the portion thereof close to the furnace, may be brought to high temperatures under vacuum. Therefore, we choose the metals or alloys so that they do not evaporate easily under a vacuum. By way of example, tubes of stainless steel comply with these conditions. It is also advantageous to make use of corrugated tubes or tubes of the "thermostatic diaphragm" type the calorific conductivity of which is lower.

Another general condition is to reduce as much as possible the power necessary for obtaining a given temperature in the furnace, because this power is finally a cause of heating of the whole of the bell jar and of its plate. In order to reduce it, we provide a reflecting screen which, as it is known, greatly reduces radiation losses which are practically the only losses to be considered under a vacuum. When there is no cooling circulation, the function of this screen, which is very useful from the point of view of the power introduced under the bell jar, is unfavorable from the point of view of cooling. The important advantage resulting from the combination of the screen and of forced cooling is thus visible.

All of these features or only some of them may be combined together in order to make an outgassing furnace, according to the rate of manufacture and to the importance of this manufacture. Figs. 5 and 6 diagrammatically show, by way of example, a furnace including the features above referred to. Fig. 5 is an end view, in the direction of the cylinder axis. 13 designates the heating elements. 14 shows the tube which shields these elements. 15 is the external screen which acts as a radiation screen. The same elements are to be found in Fig. 6. It will be seen that heating elements 13 are spiral wound. Cylindrical screen 15 is connected to flat screen 17 which closes one of the faces of the furnace, the other face serving to the introduction of the resistor carrying cylinder. Screen 15 is in contact with the cooling system 16 constituted by a spiral wound tube. But an interval might also be provided between the two cylinders. As for the circulation of the cooling gases, it is disclosed by Fig. 3. 12 is the inlet, 10 the outlet and 11 the auxiliary cooling jacket.

Of course heating by resistor elements is not the only possible one. In order to take advantage of the particularly advantageous arrangement of the resistor carrying cylinder, which includes an axial heating filament, according to another embodiment of the present invention heating of this cylinder and of the resistor supports it carries may be effected by electronic heating, by making use of the electrons emitted by the filament itself, said electrons being accelerated inside the cylinder by a sufficient potential. This acceleration will take place for instance between the filament and the tubular shield. In this case, it is the shield which will heat the resistors and the cylinder by radiation. This shield may then have a diameter and therefore an area close to that of the cylinder. Its temperature must not be very different from that of the cylinder, that is to say must not be too high, and thus the risks of soiling the resistor supports during heating will be much lower than when the filament is heated as above described. However when it is desired wholly to avoid these risks, use will be made of a composite shield made of an inner metallic cylinder surrounded by a refractory cylinder, metallizing being performed by thermal incrustation. Heating by electronic bombing is particularly advantageous when the filament is capable of reaching a sufficient electronic emissive power without too great an evaporation of the useful metal, i. e. when the metal to be evaporated is very refractory. In other cases, we will use an auxiliary filament having a good electronic emissivity for instance, if the electronic current of the evaporating filament is insufficient.

Another way of performing heating for outgassing purposes will be advantageously employed when a sufficiently powerful high frequency generator is available. In this case, the high frequency winding will surround the electrode carrying cylinder which will thus be heated by induced currents. The high frequency winding, provided it has sufficiently tight spires, will itself play the part of radiation shield. Furthermore, the high frequency conductors of this winding will consist of tubes; they will be cooled down as above, by an air stream for instance, in order to accelerate cooling of the resistor supports. Furthermore, of course, they may be cooled during the passage of the high frequency current, in order to reduce their heating and that of the bell jar by a thermal radiation. The construction will be similar to that of the air circulation furnace of Fig. 3, with the exception that both of the current passages in the bell jar can be cooled down in order to avoid high frequency heating of the plate if this plate is metallic. Furthermore, in this case, both of the passages may be grouped into a single one, of the coaxial type, in order to reduce high frequency losses. Furthermore, this arrangement has the advantage of constituting a heat interchanger for the cooling air, thus reducing the heating of the outlet passage through the plate.

It is known that another possibility of high frequency heating is that of short waves high frequency heating by dielectric losses; according to the present invention, this system of heating may be used for outgassing the resistor supports. In this case, the metallic cylinder which carries the resistors will be replaced by a slight armature made for instance of quartz having low dielectric losses. In these conditions, only the resistor supports will be heated. The important result of such an arrangement is enormously to reduce the calorific capacity of the hot portions and consequently to reduce the duration of the thermal cycle that it is considered; the other advantages are the same as those of ordinary high frequency heating.

It is well known that measurement of the temperature of an object placed in a vacuum is difficult, due to the difficulty of achieving a sufficient thermal contact between this object and the thermometric means. Now, during the outgassing of the resistor supports, it is of great interest suitably to determine the temperature of these supports in order to be able thus to reproduce as faithfully as possible the outgassing conditions, which is an important element of the uniformity of the manufacture, and also in order not to exceed the temperature at which the support begins to soften. Furthermore, it is of course advantageous, in order to improve the efficiency of a given plant, to reduce the time of manufacture, that is to say to reduce the time period necessary for heating to achieve outgassing that necessary for cooling down, and the resistor support and an ordinary thermometric element (thermo-couple or ordinary resistor thermometer) will hardly come to the same temperature, if the variation of temperature is too quick. On the other hand, it is known that the electric resistance of a great number of dielectric substances, for instance glass, decreases very quickly when the temperature rises, although the value of their resistance remains generally high. According to the present invention, we make use of this property to measure the temperature of the resistor supports by determining the value of their electrical conductivity. For this purpose, we insulate from the cylinder which carries it at least one of the ends of one or several supports and we measure, of course on the outside of the bell jar, through insulated current intakes, their electrical resistance through the usual means for measuring high ohmic resistances. Insulation of one of the ends of the support will be obtained by means of a matter the resistance of which at high temperature remains substantially higher than that of the supporting rod, for instance if this rod is made of glass, insulating may be achieved by means of silica. The method which we indicate has the obvious advantage of giving without any delay the true temperature of the support, even if the variations of temperature of the furnace are very quick. Furthermore, in the manufacture that is considered by the present invention, this method of measuring temperatures does not call for any new apparatus, the apparatus which serves to measure the resistances during and after evaporation serving also to measure the conductivity of the supports themselves. Besides the same arrangement, i. e. the use of a support insulated and connected to apparatus for measuring high resistances, will be also used for controlling evaporation in order to obtain a deposit of suitable electric resistance.

The device for rotating the supporting rods during evaporation may be adapted to the manufacture of film resistors of helical shape in order to increase the resistance for a given thickness, which is interesting chiefly when the loss by Joule effect may be high, or when the desired ohmic value is very high, for we found that stability of the resistors is not so good when the superficial ohmic value becomes too great, and for instance higher than $10^{11}$ ohms, that is to say when the thickness is too small. For this purpose, the support rods are surrounded by a helically wound strip in the portion extending between the two electrodes, and they undergo the usual treatments, but as the strip leaves a free helical surface, it is on this surface that the conductor deposit will be formed during rotation. The strip will be removed after the whole is extracted from the vacuum bell jar, before protection by a coat or a varnish or the introduction into protector tube to be subsequently evacuated.

The above methods and apparatus are used chiefly but not exclusively to perform film-like layers of a metallic nature, for all industrial uses making use of their physical or chemical properties.

It is known that considerable difficulties are encountered in the production of film-like deposits obtained by evaporation in a vacuum if these deposits are to have very good physical characteristics, in particular from the point of view of electrical conductivity, stability after a long time and linearity of the current with respect to the potential that is applied. One of the main factors in the obtainment of such a good deposit is the perfection of the vacuum during evaporation and thereafter, during the periods of storing and utilization of the deposit, and this for various reasons which will be hereinafter explained.

Now if this deposit is obtained according to the methods usually employed at the present time in a separate vessel, for instance in a vacuum bell jar, it is exposed to the action of the atmosphere when it is removed from said bell to be suitably coated or mounted in a bulb which will be evacuated. Therefore the deposit risks being soiled. This also involves the impossibility of obtaining resistances made of metals which are not chemically inert so that deposits of these metals are altered by contact with the atmosphere.

An object of the present invention is to produce various film-like deposits and especially those used for their electric conductivity, these deposits being made in bulbs which can be sealed and in which a very high vacuum is made and is subsequently maintained after sealing of the bulb whereby the deposits are constantly protected against the action of the atmosphere. This feature of our invention is especially but not exclusively applicable to the obtainment of electrical resistors and hereinafter we will refer indifferently either to deposits or to electrical resistors.

Evaporation in a vacuum bell jar and subsequent sealing in a vacuum of the film-like electrical resistance thus obtained involves very great difficulties when the substance that is evaporated is not perfectly inert, for instance in the case of metals which are not noble, due to evaporation in the presence of air. According to our invention, film-like resistors of any metal whatever, even chemically active, are made by carrying out the evaporation in bulbs which are immediately sealed so that the deposits are never in contact with the atmosphere.

Starting from the known experimental result according to which the electric resistance of thin deposits varies with the amount of adsorbed gases, therefore with the degree of vacuum, highly stable deposits will be obtained as above stated by taking advantage of the possibility of forming and maintaining in the bulb a very high vacuum. This bulb can be outgassed at high temperature under a vacuum, before the metal is deposited, which is impossible when the deposit is made in a vacuum bell jar and is subsequently sealed, after contact with air, in an evacuated tube because in this case a sufficient outgassing temperature might injure the deposit, especially when its thickness is small, that is to say when its resistance is high.

It will be reminded that it has been found experimentally that evaporated thin layers of dense and hard refractory metals have the lowest structural evolution as a function of time. Now, among the metals which have these properties, it is advantageous to choose metals such as molybdenum, tantalum or tungsten. As atmospheric air exerts a strong action upon thin layers of such metals, very stable resistors will be obtained, chiefly with refractory and hard metals (but which are not chemically inert), without exposing the deposit to the atmosphere, by carrying out the evaporation in tubes adapted to be subsequently sealed, according to the invention. We thus obtain three advantages, to wit a higher stability due to the high vacuum resulting from the absence of adsorption effects, a higher structural stability and a relatively low cost of manufacture.

It is known that film-like conductor deposits give a current which is more or less proportional to the potential that is applied, that is to say have a resistance depending upon this potential, especially for high ohmic values. According to the known results, this effect of the potential upon the resistance is chiefly due to the fact that the field that is applied lowers the potential barriers between the metallic aggregates which constitute the deposit, and that consequently it may depend upon the structure of the deposit.

According to the present invention, we obtain film-like resistors of a value practically independent of the potential that is applied by starting from the result of our experiments, to wit that deposits of refractory and hard metals such as tungsten, molybdenum, tantalum, iridium, which have a very fine granular structure, also have a very low effect of the potential upon the value of their resistance. In view of the fact that these metals are, as above stated, mostly non-inert from the chemical point of view, they must not be exposed to the atmosphere. We therefore obtain resistors having a very low variation as a function of the potential that is applied by evaporating refractory and hard metals (which are not necessarily inert), this evaporation being made in a bulb adapted to be sealed according to the methods hereinafter described. Use of the above metals is particularly interesting because their deposits already have the advantage of a high structural stability.

According to our invention, the method of manufacture will be substantially as follows, the following examples having no limitative character. In a glass bulb, provided with a pumping nipple, are disposed two electrodes and an axial evaporating filament. The two electrodes are obtained for instance by chemical reduction of a solution of platinum or silver, or both combined together, and they will be in electric contact with a connecting wire which can be welded to the mass of glass. A cylindrical shield, of glass or mica for instance, surrounds the filament and may be displaced magnetically from the outside owing to a small piece of iron enclosed in a glass tube fixed laterally to the shield. The bulb is welded to a pipe leading to a high vacuum source and undergoes outgassing at hot temperature. The filament is then heated up to the temperature of evaporation of the metal that is used so as to drive out the dissolved gases. The volatile impurities, for instance the oxides, and a little of the evaporated metal then deposit on the shield. Then the shield is displaced and evaporation is carried out until the desired value of the resistance is obtained and the bulb is separated from the vacuum conduit. The shield makes it possible to outgas the filament without soiling the surface which is to receive the useful deposit. It is very important to have the shield guided in such manner that it does not participate to conductivity and does not scratch the useful deposit. Fig. 7 gives an example of such a method: $a$ is the wall of the bulb, $c$ is one of the outputs communicating with platinum electrodes such as $k$; $h$ is the shield with its iron mass $g$ and $f$ and $e$ are the outer ends of the evaporating filament $b$.

Evaporation in bulbs that can be subsequently sealed and under high vacuum will make it possible to obtain several resistors in the same bulb. This can be effected for instance by making use of a shield provided with apertures through which we evaporate a conductor substance at several places and between electrodes in contact with current intakes extending from the outside to the inside of the bulb. These conditions will be carried out in the following manner: the axial filament will be surrounded by a cylindrical shield provided with one or several slots; the inner wall of the bulb will be fitted with pairs of electrodes which can be obtained for instance as above stated. Outgassing will be performed with the shield protecting all the spaces between opposed electrodes. Formation of the desired resistors along these spaces by evaporation of the filament will be made either simultaneously or successively according to the number of slots of the shield and according as it is desired to have resistors of substantially the same resistances or of very different resistances. In this case, by a rotation of the shield about its axis, the slots will be brought opposite the two opposed electrodes. This method has the advantage of supplying in a single bulb, and at a relatively low cost, a set of equivalent or different resistors which occupy but little space. A particular advantage of a set of resistors such as thus obtained is as follows: if, despite the high vacuum, a small evolution of the value of the resistance occurs (by variation of the vacuum in the bulb or modifications of structure), this evolution will generally be substantially the same for all the resistors in the bulb, which have been made in the same conditions and kept in the same vacuum so that it will be easier to make corrections for the small variations of the resistances as a function of time. In particular, it may occur that the ratio of two resistances of the bulb remains constant with a very high accuracy, whereas their absolute values will undergo small variations. This may be very advantageous in some layouts, for instance in bridge arrangements. By way of non limitative example, Fig. 8 shows a bulb containing a plurality of resistors. *b* is the filament with its external connections *e* and *f*, *c* is one of the connections of one of the film-like resistors. Shield *h* is provided with a slot through which the filament is visible. The length of this slot must be greater than the distance between two opposed electrodes such as *k*. The shield may be rotated by means of a small iron piece placed in Fig. 8 at the top and the right hand side, in a small bulb welded to the shield.

It is known that resistors for high voltages must comply with very difficult conditions: good dissipation of heat despite heating by Joule effect and the action of the voltage that is applied, and good dielectric rigidity, in particular superficially. Now, on the one hand, it is known that a high vacuum has a dielectric rigidity whereas a poor vacuum is on the contrary a bad insulator. On the other hand, we have found experimentally that layers (even thin) of refractory substances such for instance as molybdenum, tantalum, tungsten, carbon, withstand perfectly well, in a good vacuum, high temperatures (for instance close to that for which glass becomes soft) with an important irreversible variation of their resistance.

Starting from these facts, we apply the method of evaporation in bulbs adapted to be sealed under a high vacuum to the production of film-like resistors for high voltages, in particular by evaporation of refractory and heavy substances.

Preservation for a practically unlimited time of an excellent vacuum due to the preliminary outgassing of the bulb, structural stability of deposits of refractory substances such as those just cited (which properties can practically be obtained only by the methods of the present invention) make it particularly advisable to apply the methods according to our invention to the manufacture of resistors for high voltages. Resistors obtained by these methods may withstand a high Joule effect, the more so as the conduction of heat toward the outside is good since the layer is on the very wall of the bulb and this bulb may possibly be immersed, if necessary, in a suitably cold liquid bath which is a good electric insulator. The dimensions of the resistors will be adapted to the conditions of operation. For instance, the length will be as great as possible in order to avoid superficial injury along the external surface of the bulb. If external superficial leakage is feared, an external protective ring connected with the earth will be provided, this ring being obtained by chemical depositing of platinum, silver, etc. Likewise, the diameter and the length of the bulb may be increased so as not to exceed a given Joule disengagement per unit of area of the metallic film-like resistor.

In a high voltage resistor, the length of the conductor deposit must sometimes be rather great, and however it is desirable to have a total overall length of the bulb as small as possible, despite the use of a shield during the outgassing of the filament. It is an object of the present invention to provide film-like deposits for high voltage resistors in sealed bulbs having one or all of the following characteristics: possibility of outgassing of the evaporator filament by means of a shield; disposition of the shield so as not to increase too much the total length of the bulb which contains the deposit; arrangement of the shield such that its own conductivity or that of the outgassing deposit it has received have no effect upon the conductivity of the useful deposit made upon the wall of the bulb; arrangement of the shield to avoid scratching of the useful area of the deposit; useful deposit upon the bulb covering all the inner side wall thereof, so that this symmetry of revolution about the axis of the bulb reduces the local fields capable of producing losses by effluvium or by a disruptive discharge; long and sinuous deposit, but generally without sharp angles in a relatively short bulb, in order to obtain high resistances with a deposit of relatively great thickness capable of an improved stability in the course of operation under high voltage; screens placed inside the bulb so as to prevent the conductor deposits connecting the useful deposit to the ends of the evaporator filament.

We will now describe some embodiments of our invention.

In order to avoid all the difficulties due to the shield, a method of construction will consist in outgassing in the bulb the filament surrounded by a shield, then allowing air to enter the bulb, removing the shield, closing the bulb and again making a vacuum therein and finally effecting evaporation of the useful deposit. Fig. 9 illustrates an example of such a method. Evaporating element *b* is mounted in bulb *a* with its external connections *f* and *e*, the end *l* of the bulb being opened. Through this end, there is introduced a shield which surrounds filament *b*. A vacuum is made in the bulb and the filament is outgassed. Then the bulb is opened at *l*, the shield is removed, the bulb is again closed at *l* and the air present therein is pumped out through any suitable nipple. The desired deposit is then formed between the two electrodes previously prepared one of which is shown at *k*. Then the bulb is closed. This method makes it possible to outgas the filament without requiring manipulation thereof after its outgassing when it is generally very brittle. The shield which surrounds the filament during its outgassing is for instance a glass tube opened over its whole length along one generatrix. This opening makes it possible to pass electrode *f*. The opening is closed during the outgassing operation through any suitable means, for instance by means of a glass rod. A cylindrical screen made of a sheet of mica, wound and applied against the wall of the bulb, may also be used without electrode *f* preventing its insertion. At least one screen is placed on one or each of the current intakes leading to the filament, on the side of connection *e* in the case of Fig. 9. This screen is constituted for instance by a glass coating, flaring out at one end and surrounding passage *e*, this glass portion being welded to the foot of electrode *e* or coming very close thereto, so as to obtain a sufficient fixity of the screen which must extend very close to the wall of bulb *a* but must not touch it. As for the electrode of the deposit which forms the useful resistance in Fig. 9, one of them *c* is independent and the other is connected to connection *f*.

A modification consists in introducing and withdrawing the shield which surrounds the filament while maintaining the vacuum in the bulb owing to the use of a tube of a suitable diameter which is connected at *l* (Fig. 9) and is then placed under vacuum. This avoids the contact of air with the filament after its outgassing.

Figure 10:
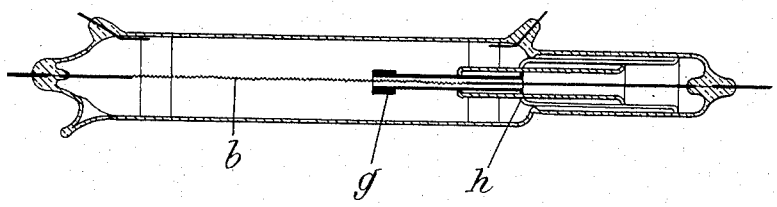

Other methods make it possible to use a shield which remains permanently in the bulb but however without having too great a dimension in the direction of length. One of these methods is based upon the use of a telescopic shield made of several portions sliding in one another and provided with stopping flanges. Fig. 10 shows such a construction. Shield *h* is provided with a magnetic material mass *g* at the end of one of its sections. It is shown partly folded up in an extension of the bulb. This arrangement avoids any friction on the shield upon the useful wall of the bulb, that is to say on the middle portion thereof. In the example illustrated by Fig. 10, the shield is metallic, made of very thin tubes, but this shield might be made of glass or any other material for use in a high vacuum. A magnet or an electro-magnet, but preferably a cylindrical electromagnet in line with the bulb, operates the shield by acting upon part *g* thereof. Once the shield has been folded up, it still plays the part of a screen protecting one of the current intakes of the evaporating filament.

Another system including a shield which remains permanently in the bulb consists in making use of a shield made of two or several cylindrical sectors which surround the filament and which may, by rotation with respect to each other, form a closed cylindrical surface during the outgassing operation while leaving a sector opened during the period of evaporation of the desired conductor deposit. Furthermore, for instance by rotation of the whole of the shield, it will be possible to perform successive evaporations on several sectors of the surface of the bulb thus forming several different deposits or a continuous final deposit which covers all the area of the bulb between the electrodes after they have connected said resistance.

Figures 11, 11A:
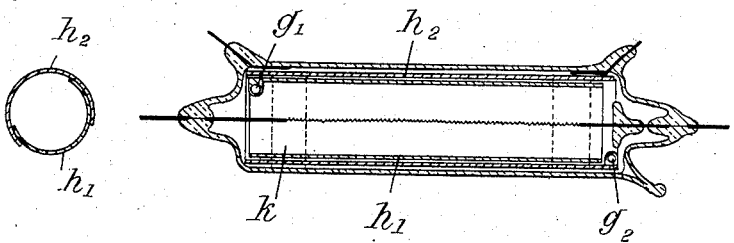

Fig. 11 illustrates this embodiment of our invention. In this figure, the shield is made of only two sectors, $h_1$ and $h_2$, provided with small glass coated iron cores. By the action of a magnet or an electro-magnet, $h_1$ is rotated with respect to $h_2$. In the position shown by the drawing, the shield is closed. This is the position for the outgassing operation. A rotation of the parts of the shield makes it possible to open a sector of at most 120° in the present case. Evaporation through this sector forms a conductor deposit between electrodes such as $k$. Several evaporations of this kind for different positions of the system $h_1$, $h_2$ will make it possible to obtain a continuous deposit over the useful area of the bulb. A screen is disposed near at least one of the connections of the evaporating filament. Shield $h_1$, $h_2$, in the course of its rotation, never rests upon the useful surface of the bulb between the electrodes such as $k$. It bears upon the bulb at points close to but not too near the ends thereof, so that the more or less conducting layer deposited upon the shield during evaporation is not in electric communication with the deposit formed on the inner wall of the bulb. Thus, insulation between these two deposits is ensured by a sufficient length of the external surface of the shield which is free from any deposit due to the fact that it is not acted upon by the evaporating filament.

Figure 12:
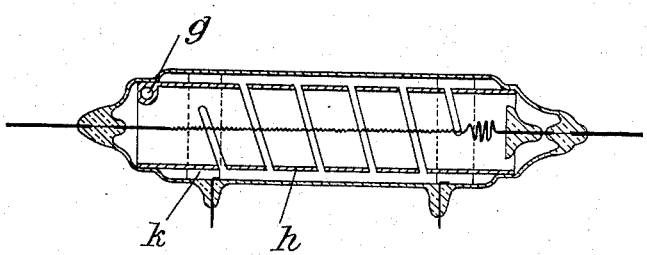

Long film-like deposits will be obtained in a relatively short bulb owing to the use of a shield provided with a helix-shaped aperture, thus forming a helical shaped diaphragm which surrounds the evaporating filament. As above, in order to avoid electric conduction through the shield, this shield is disposed in such manner as to bear upon the bulb only through its external portion and rather far from its ends. With such a shield, it is possible to proceed in different ways. For instance a rotation or a translation along the axis will make it possible to obtain successive deposits arranged in helical fashion which may either adjoin one another or not, thus varying the effective width of the deposit. It will also be possible to outgas the filament over a free portion of the area of the bulb, the shield being then in a given position, then to move or to turn this shield so as to perform the desired final deposit upon another portion of the bulb, which was precedingly protected by the shield. Owing to the helical shape thereof, it will suffice to give it a very small movement with respect to the length of the bulb in order to obtain this result. Fig. 12 shows a helical shaped diaphragm shield. $k$ is one of the electrodes limiting the resistance that is used, $h$ is the shield with an iron piece $g$ permitting a rotation or a slight translation thereof. The pumping nipple has not been shown. The shield does not touch the middle portion of the bulb which is of larger diameter.

It will also be possible, in embodiments making use of a helical diaphragm, to outgas the filament under protection of an auxiliary shield, which will then be removed from the bulb. This arrangement would correspond to a combination of Figs. 9 and 12.

By the movements of two coaxial diaphragm-shields each of which is provided with a helical slot, it will be possible to protect the whole of the useful area of the bulb with a very small relative movement of said shield, for instance with a rotation of a small angle. It will thus be possible to achieve full protection during outgassing. Furthermore, the width of the helical deposit will be adjusted by a relative movement of the two shields. The other possibilities of utilization of the simple helical shield also apply to the case of the double shield.

Several resistors in series may be obtained by any of the above described methods, by providing several electrodes such as shown at $k$. An intermediate electrode for this purpose is shown in Fig. 9 in dotted lines. Such multiple resistors may act for instance as voltage dividers.

In the method above described, the film-like deposit was formed and used under a high vacuum, the existence of a very good vacuum making it possible to apply a high voltage. However, if a poor vacuum is, as already above stated, a very bad insulator, it is known that compressed gases have excellent dielectric properties. According to the present invention, after the film-like deposit has been formed in a high vacuum, the bulb will be filled with a gas compressed under pressure, for instance under a pressure of one or several atmospheres and the deposit will be used under this gas pressure. This method has the advantage of making it possible to place under pressure a very pure inert gas even in the case of oxidizable deposits which cannot withstand contact with the atmosphere. In addition to the advantages relative to the disruptive potential, we will thus obtain a better evacuation of the heat given off by the Joule effect. If necessary, the bulb will be made of thick glass and will be generally but not necessarily filled by means of the known method which consists in cooling it so as to condensate small amounts of gas in the liquid or solid state, in predetermined quantity so that after reheating the pressure has the desired value. The nipple will be sealed by means of a blow-pipe, the bulb being cooled down and the whole allowed to return to the surrounding temperature. Another filling method will consist in merely admitting gas under the desired pressure and in closing the nipple which in this case will be metallic, by the known method of crushing under a sufficient pressure. In this case, the whole of the bulb will be advantageously made of metal, provided with electric connections of glass and metal welded to the bulb.

Film-like deposits prepared under vacuum in another vessel, for instance in a vacuum bell jar may be enclosed, after having been exposed to the atmosphere, in bulbs which will be finally filled with a gas under pressure. Such a method will make it possible to apply the method of evaporation under a vacuum bell jar to the obtainment of resistors for high voltages. As a matter of fact, it has already been stated that in this case it is difficult sufficiently to outgas the bulb where the deposit is enclosed and the vacuum therein is quickly deteriorated.

We have found that metals evaporated on layers, even very thin, of refractory and hard metals have advantages analogous to the deposits of said refractory and hard metals. Therefore, according to our invention, stable and linear film-like resistors will be obtained by evaporating any metal on a preliminary layer of a refractory and hard metal.

Of course the above described methods and devices concerning high voltage resistors are not to be exclusively applied to such voltages and may be used also under relatively low voltages.

Of course, all that has been stated above concerning an "evaporating filament" applies without modification or with obvious modifications to all kinds of evaporation: small pieces of the metal to be evaporated, strips, retorts, heating by electronic bombarding, high frequency heating, etc.

Deposits as above described have many interesting physical properties among which first their electrical resistance but also the following properties given merely by way of example: impedance, high frequency, magnetic properties, very low coefficient of temperature for moderately thin deposits, negative and high temperature coefficient for very thin deposits, and generally the properties analogous to those of "thermistors" for thin deposits.

What we claim is:

1. A device for simultaneously making a plurality of film-like electric resistors which comprises, in combination, a vacuum container, a support of cylindrical shape in said container, means on the support for supporting a plurality of small rods of an insulating substance along respective lines parallel to generatrices of the cylindrical surface thereof, a cylindrical wall carried by said support inside said set of rods, the length of said cylindrical wall being greater than that of said rods, said wall being provided with slits parallel to said rods and located between each of them and the axis of said cylindrical surface, a metal filament extending along the axis of said surface and adapted to receive electric current for thermal vaporization of the metal thereof, means for heating said rods for outgassing thereof, and means for temporarily preventing vapors of said metal from reaching said rods.

2. A device according to claim 1 in which the means for temporarily preventing vapors of said metal from reaching said rods consist of a shield interposed between said wall and said filament and shiftable with respect to said wall so that it can be retracted from the interval between said slits and said filament.

3. A device according to claim 1 in which said means for temporarily preventing vapors of said metal from reaching said rods consist of a mechanism for moving said filament axially with respect to said support, whereby said filament can be removed from the space between said rods.

4. A structure according to claim 1 further including means carried by said support for rotating said rods about their respective axes.

5. A device according to claim 1 further including heating means for degassing said rods disposed around said support, shielding means surrounding said heating means to prevent soiling of said rods by said heating means, and cooling means surrounding said heating means.

References Cited in the file of this patent

UNITED STATES PATENTS

| | | |
|---|---|---|
| 2,043,966 | Whiston et al. | June 9, 1936 |
| 2,369,764 | Ullrich | Feb. 20, 1945 |
| 2,391,595 | Richards et al. | Dec. 25, 1945 |
| 2,476,592 | Fruth | July 19, 1949 |
| 2,522,272 | Johnson et al. | Sept. 12, 1950 |
| 2,586,752 | Weber et al. | Feb. 19, 1952 |

FOREIGN PATENTS

| | | |
|---|---|---|
| 517,586 | France | Dec. 20, 1920 |